United States Patent [19]

Friese et al.

[11] Patent Number: 4,671,013

[45] Date of Patent: Jun. 9, 1987

[54] CAB WINDOW ASSEMBLY

[75] Inventors: Donald E. Friese, Northridge; Gerald P. Wirkkala, Downey, both of Calif.

[73] Assignee: Noran, Los Angeles, Calif.

[21] Appl. No.: 790,034

[22] Filed: Oct. 22, 1985

[51] Int. Cl.⁴ .............................................. E06B 1/00
[52] U.S. Cl. ...................................... 49/380; 49/352; 296/146
[58] Field of Search ................ 49/380, 352, 348, 350, 49/351, 349, 374; 296/146

[56] References Cited

U.S. PATENT DOCUMENTS

| | | |
|---|---|---|
| 12,640 | 3/1855 | Murtaugh . |
| 216,568 | 6/1879 | Holske . |
| 288,352 | 11/1883 | Low . |
| 311,253 | 1/1885 | Morse . |
| 1,519,194 | 12/1924 | Ellery ............................. 49/351 X |
| 2,415,565 | 2/1947 | Rappl ................................... 49/349 |
| 2,432,799 | 8/1942 | Rappl . |
| 2,658,790 | 11/1953 | Fish et al. ............................ 49/350 |
| 3,014,716 | 12/1961 | Hitzelberger ..................... 49/352 X |
| 3,770,312 | 11/1973 | Shadburn . |
| 4,001,971 | 1/1977 | Gobush et al. . |
| 4,110,935 | 9/1978 | Sessa . |
| 4,119,341 | 10/1978 | Cook . |
| 4,168,595 | 9/1979 | Pickles et al. ........................ 49/352 |
| 4,222,202 | 9/1980 | Pigeon . |
| 4,393,753 | 7/1983 | Chatlos ........................... 296/146 X |
| 4,400,913 | 8/1983 | Krantz et al. ..................... 49/374 X |

FOREIGN PATENT DOCUMENTS

| | | |
|---|---|---|
| 683158 | 6/1929 | France . |
| 977384 | 3/1961 | France . |
| 631190 | 11/1949 | United Kingdom . |
| 754717 | 8/1956 | United Kingdom ................. 49/380 |

Primary Examiner—Philip C. Kannan
Attorney, Agent, or Firm—Spensley Horn Jubas & Lubitz

[57] ABSTRACT

A power window enclosure for replacing the cab window in trucks is disclosed. The enclosure comprises a glass windowpane housed in a substantially self contained flat rectangular enclosure having an upper portion dimensioned to fit in the cab window and defining a window opening and a lower portion containing means for raising and lowering the window. Furthermore, the windowpane is raised and lowered by a plurality of pulley lines coupled to the window pane and to a reciprocating block that selectively pulls on the lines, thereby raising and lowering the window.

30 Claims, 12 Drawing Figures

CAB WINDOW ASSEMBLY

BACKGROUND OF THE INVENTION

1. Field of the Invention

This invention relates to a power window replacement module for the rear cab window of a truck.

2. Description of the Prior Art

In typical truck cabs, as provided by the manufacturer, the rear window of the truck cab cannot be opened. It is a solid piece of glass that has been glazed into the truck cab and held in place by interior and exterior window gaskets.

Consumers have found it highly desirable to be able to open the rear window of the truck cab. For example, opening the rear window improves air circulation. Some automobile accessory manufacturers have attempted to meet this demand by providing substitute windows which are split, horizontally moving windows. The original glass provided by the manufacturer is removed and the substitute, split window is inserted in its place. In these substitute windows, one-half of the window is adapted to slide past the other half in a horizontal direction. Although such windows do improve air circulation, at best, only one-half of the window may be opened to permit the flow of air into the cab.

Furthermore, such substitute window units have a further disadvantage when used with camper shells mounted on the pickup truck. Typically, such campers have a window that is positioned immediately behind the cab window of the pickup truck. If a substitute split window is used, access between the cab and the camper via the adjoining windows is limited because only one half of the window opening is available. Alternatively, the entire original window may be removed and a tube made of cloth or rubber or similar substances may be used for providing access between the cab and the camper. However, the camper body is frequently removed from the truck at a later date; thus, a piece of glass such as provided by the original manufacturer needs to be remounted in the window opening. Such replacement of the cab window is not readily done by the owner of the truck and is expensive.

It would thus be highly desirable to have a rear window unit that is fully retractable into the truck cab. Such a window unit is disclosed in U.S. Pat. No. 4,119,341 to Cook.

However, prior art embodiments have certain shortcomings. Given the substantial weight of the glass window, the gear and lever arm system used for raising and lowering the window between the fully closed and fully opened positions requires a large amount of torque. Therefore, the motor that is used for providing the mechanical power to raise and lower the window has to be quite powerful. Such motors are expensive and also are relatively noisy.

Furthermore, prior art units may not easily be installed by the typical consumer. In particular, these prior art window units require that various components of the assembly be welded onto the cab body. The typical consumer does not have ready access to welding equipment. Furthermore, the prior art enclosures require a substantial amount of space.

Thus, it is a first object of this invention to provide a power window assembly which is thin and compact, having a window that may be fully raised and lowered in place. A second object of this invention is to provide a construction that is easily mountable in a truck cab without special tools such as welding equipment. It is a further object of this invention to provide a unit that does not require as much torque out of the motor to raise and lower the window. It is yet another object of this invention to provide such devices with adequate sealing from weather and with full and free access between the truck body and a camper mounted behind the cab.

SUMMARY OF THE INVENTION

These and other objects are accomplished by having a window assembly comprising an integral, substantially rectangular, flat modular power window enclosure mountable through the window opening, with an upper portion of the enclosure forming a window frame and dimensioned to fit within the window frame of the vehicle. The windowpane is housed within the enclosure and is movable between a raised "window closed position" and a lowered "window open position."

To hold the modular power window enclosure in the window opening, there is a bracket in the middle of the enclosure adapted to engage the lower frame edge of the vehicle window opening and support the weight of the modular enclosure on that lower frame edge. A flange formed along the uppermost surface of the modular enclosure is adapted to engage the interior window gasket of the window to further securely hold the modular assembly in place.

Means for raising and lowering the window is housed in a lower portion of the enclosure that may be inserted through the vehicle window opening. The means comprises a reciprocating block movable towards either side of the vehicle cab with pulley lines coupling the block to a windowpane support bracket mounted along the bottom of the windowpane. A pulley line is secured at each end of the window pane support bracket. Moving the block towards one side of the cab causes the windowpane to be lowered and moving the block towards the other side of the cab causes the window to be raised. The reciprocating block is attached to a slotted tape and is reciprocated back and forth by a reversible motor that is coupled to a gear that engages the slots of the tape.

DETAILED DESCRIPTION OF THE INVENTION

Figure 1:
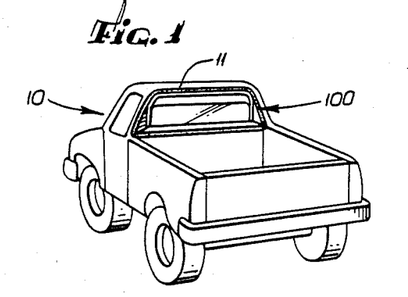
FIG. 1 shows a pick-up truck incorporating the inventive modular power window assembly.
Figure 2:
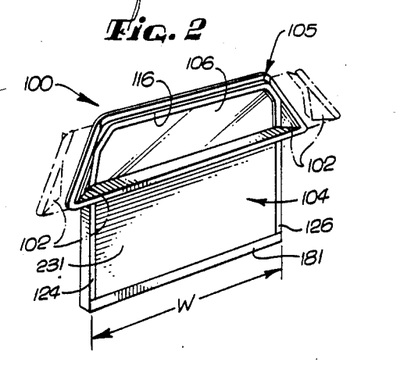
FIG. 2 is a rear perspective view of the inventive modular power window assembly.
Figures 3, 4:
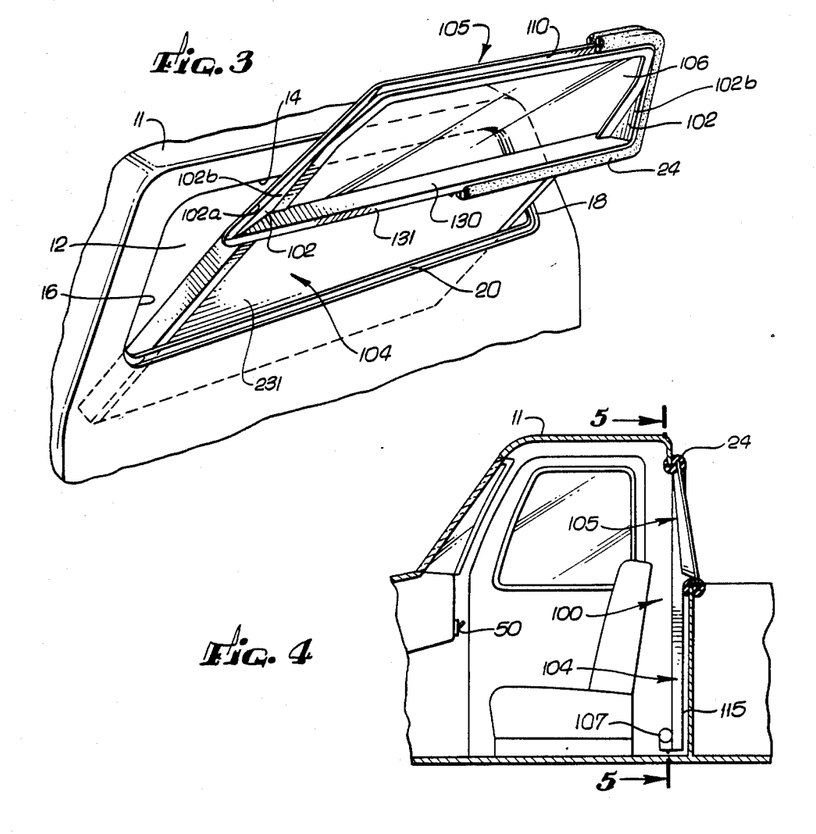
FIG. 3 is a rear perspective view of the inventive window assembly shown in FIG. 2 being installed in the rear window opening of a pick-up truck cab.
FIG. 4 is a cross-sectional view of the truck cab with the inventive power window assembly installed.

FIG. 1 shows a truck 10 with the new modular power window assembly 100 installed. Referring now to FIGS. 2 and 3, it can be seen that the modular power window assembly 100 comprises an enclosure provided by lower portion 104 and upper portion 105, having a substantially flat, rectangular shape and containing a glass windowpane 106 that is movable between a raised and lowered position. The means for raising and lowering the window is housed in the lower portion 104 of the enclosure. The upper portion 105 of the enclosure defines an enclosure window opening 116 which the windowpane 106 closes when the pane is in the fully raised position. The upper portion 105 is also configured to fit within the rear window opening 12.

Typically, the rear window opening 12 has a substantially trapezoidal shape with side frame edges 16 and 18 and with a lower frame edge 20 that is longer than the upper frame edge 14 and a pinchweld flange 22 (FIGS. 11 and 12) formed along all four edges. A gasket 24 with an "S" shaped cross-section is mounted about the window opening. The pinchweld flange 22 is fitted into a front channel 26 formed along the perimeter of the gasket and a glass plate window (not shown) provided by the truck manufacturer is mounted in a rear channel 28 formed along the inner edge of the gasket.

To allow for easy installation of the assembly 100, the lower portion 104 (FIG. 3) of the enclosure is of lesser width than the window opening 12 to easily be passed through it, while the upper portion 105 has substantially the same configuration as the trapezoidal window opening 12. Furthermore, the perimeter of the upper portion 105 is configured to be inserted into the rear channel 28 of the gasket 24 where the glass plate window was originally mounted. In particular, the width W (FIG. 2) of the lower portion 104 is less than the overall length of the lower frame edge 20.

To install the asembly 100, the gasket 24 and the original plate glass window are removed and the plate glass window is discarded. The gasket is then mounted about the perimeter of the upper window frame portion 105 of the modular enclosure, as shown in FIG. 3. A flange 110 formed on top of the upper portion, the edges 102a of the corner pieces 102 and the bracket 131 on the exterior brace 130 form the perimeter of the upper portion 105. This entire perimeter of the upper portion 105 is fitted into the rear channel 28 of the gasket 24.

The lower portion 104 then is lowered through the window opening 12 as shown in FIG. 3. After the assembly 100 has been lowered into the truck, the front channel 26 of the gasket 24 is fitted over the pinchweld flange 22 of the truck cab 11 along the bottom edge of the frame. Then, the enclosure is tilted to the substantially vertical position shown in FIG. 4 with part of the rear face 115 of the enclosure abutting against the rear interior wall of the cab 11. When the enclosure is in this substantially vertical position shown in FIG. 4, the remainder of the pinchweld flange 22 is fitted into the front channel 26. This results in the mounted configuration shown in FIG. 11.

Figures 10, 11, 12:
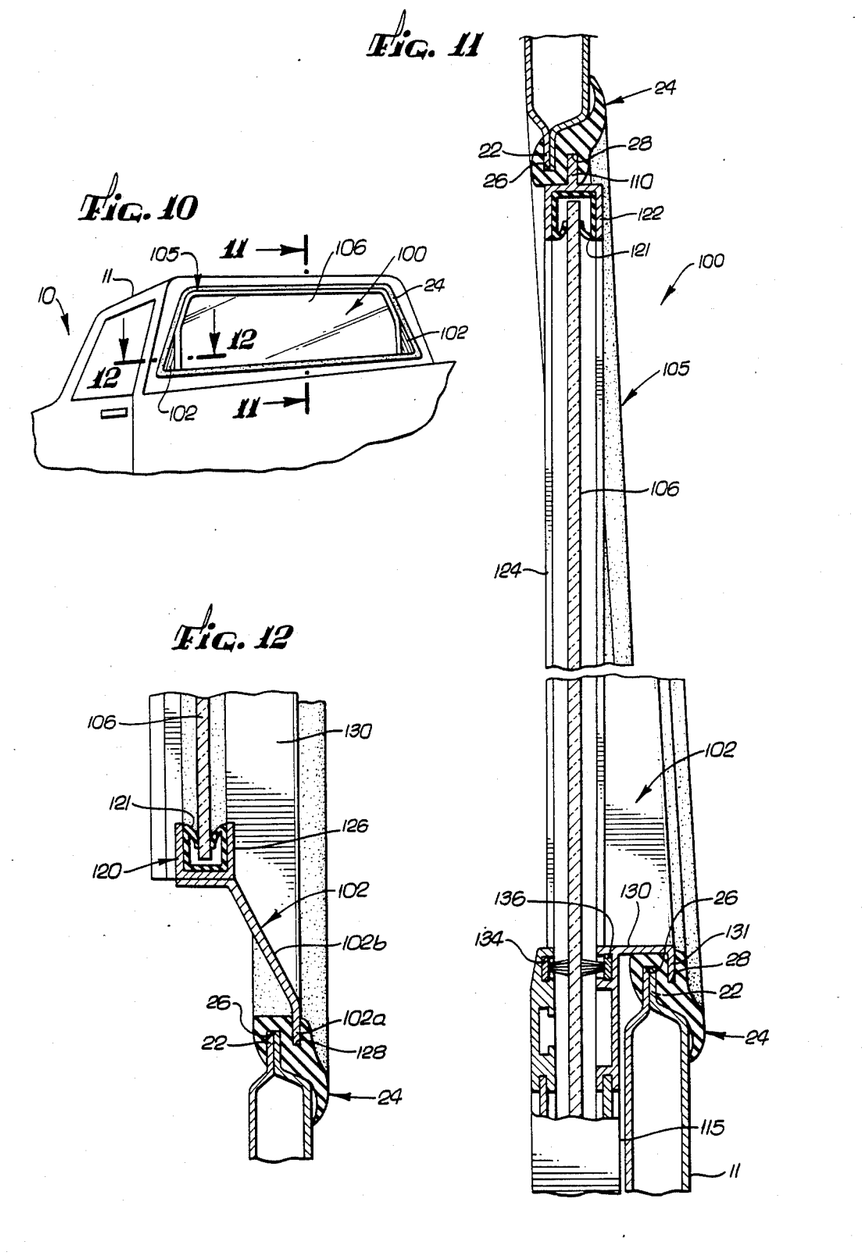
FIG. 10 is a rear perspective view of the top portion of the inventive power window assembly installed in a truck cab.
FIG. 11 is a partial sectional view taken along line 11—11 in FIG. 10.
FIG. 12 is a partial sectional view taken along line 12—12 in FIG. 10 and rotated 90 degrees counterclockwise.

The edges 102a of the corner pieces 102 (FIGS. 10 and 11) also fit into the gasket 24 at the sides of the cab window. As a result, with the corner pieces 102, the flange 110 and the bracket portion 131 all inserted in the rear channel 28, the entire power window replacement assembly 100 is securely held in place. The weight of the assembly 100 is substantially borne by the lower window frame on which rests the bracket 131, as shown in FIGS. 4 and 11. No welding is required to install or secure the enclosure 100 in place. The perimeter of the upper portion, comprising the edges 102a of the corner pieces, the bracket 131 and the flange 110, all seat into the same channel 28 that originally secured the plate glass window.

The construction that provides the configuration of the modular, power window assembly 100 may more readily be seen in FIGS. 5 through 9. An inverted "U" shaped frame 120 defines three of the four edges of the substantially flat, rectangular enclosure with the "U" shaped frame comprising a top bight portion 122 and left and right depending legs 124 and 126. The frame 120 has a substantially "U" shaped cross section (FIG. 6) with a flexible automotive channel 121 lining the interior of the frame 120. The windowpane 106 is also mounted in the frame and is vertically moveable in the frame between a raised position filling the enclosure window opening 116 and an opened position when the window is lowered into the lower portion 104.

To allow the windowpane 106 to move vertically with the perimeter of the upper portion 105 mounted in the rear channel 28 of the gasket 24 and with the lower portion 104 mounted in the cab 11, the legs 124 and 126 of the frame 120 are actually at a slight angle to the perimeter of the upper portion 105 (FIG. 11). This angle is attained by use of the rearward extending, exterior cross brace 130 and the rearwardly angled corner pieces 102.

The corner pieces 102 are shaped to conform to the corners of the rear window opening 12. A face 102b (FIG. 12) of the corner piece 102 is angled toward the rear of the truck from where the corner pieces 102 are affixed to the frame 120. By angling this face, the outer edge 102a of the corner piece 102 is adapted to be mounted in the rear channel 28 of the gasket 24. To ensure that no moisture can leak where the corner piece 102 is joined to the frame 120, the corner pieces are riveted to the frame and caulked to provide proper sealing.

Interior and exterior cross braces 130 and 132 (FIG. 6) and the bottom channel 181 (FIG. 7), which couples the two depending legs 124 and 126 together, provide further structural rigidity to the enclosure. Interior and exterior pile brushes 134 and 136 (FIG. 6) are mounted in slots in the two braces 130 and 132 with the windowpane 106 positioned between these two brushes. The function of these two brushes is to protect the glass from the braces and to prevent dust and dirt particles from entering the interior of the enclosure 100.

Figure 5:
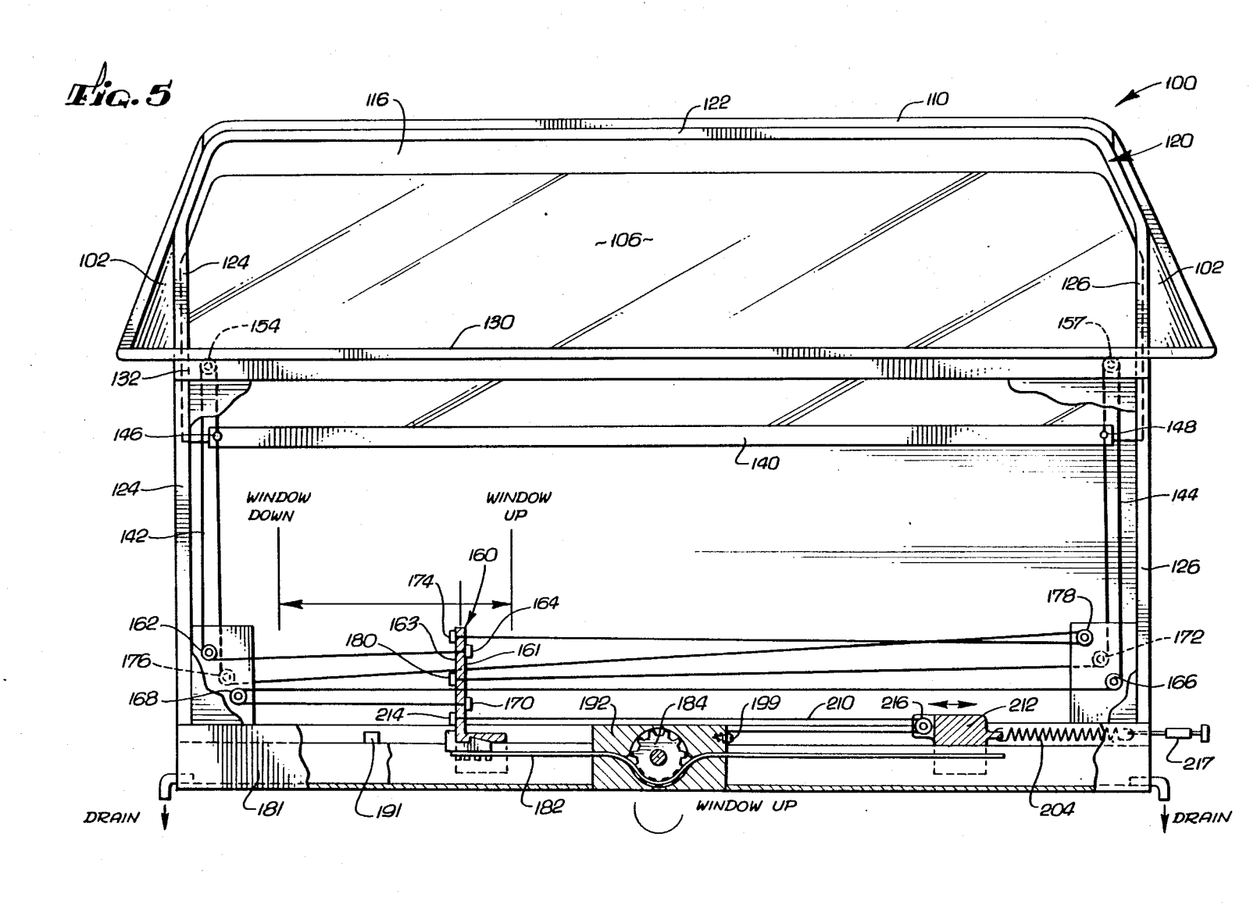
FIG. 5 is a sectional view of the inventive window assembly taken along line 5—5 in FIG. 4.

The means for raising and lowering the windowpane 106 is also shown in FIG. 5. To move the windowpane up or down, the reciprocating block 160 is moved either to the left or right, thereby pulling on the appropriate ends of the pulley lines 142 and 144. Both pulley lines are fastened at about their midpoint to opposed ends of a windowpane support bracket 140 at tie points 146 and 148. The ends of each line are attached to opposed faces 161 and 163 of the block.

The reciprocating block 160 raises the windowpane by being moved to the right side of the cab, thereby pulling on both lines 142 and 144 where they are fastened to the face 161 of the block 160 at tie points 164 and 170. To lower the window, the reciprocating block moves to the left, thereby pulling on the other ends of the lines where they are fastened to the opposed face 163 of the block 160 at tie points 174 and 180.

To allow the two ends of each line to be attached to a different face 163, reversing pulleys 178 and 168 are provided. The left pulley line 142, for example, is attached to the right face 161 of the reciprocating block 160 at tie 164 and is dressed around the up pulley 162, and the raising pulley 154, which is attached to the brace 132. The line is affixed to the windowpane bracket support 140 at the tie point 146 and then routed through the down pulley 176 about the reversing pulley 178 and secured at the opposite face 163 of the reciprocating block 160 at the tie point 170. The right pulley line 144 is routed in a substantially symmetrical manner about pulleys 172, 157, 166 and 168. Thus, by moving the reciprocating block 160, in the appropriate direction the windowpane 106 may be raised and lowered.

Figure 7:
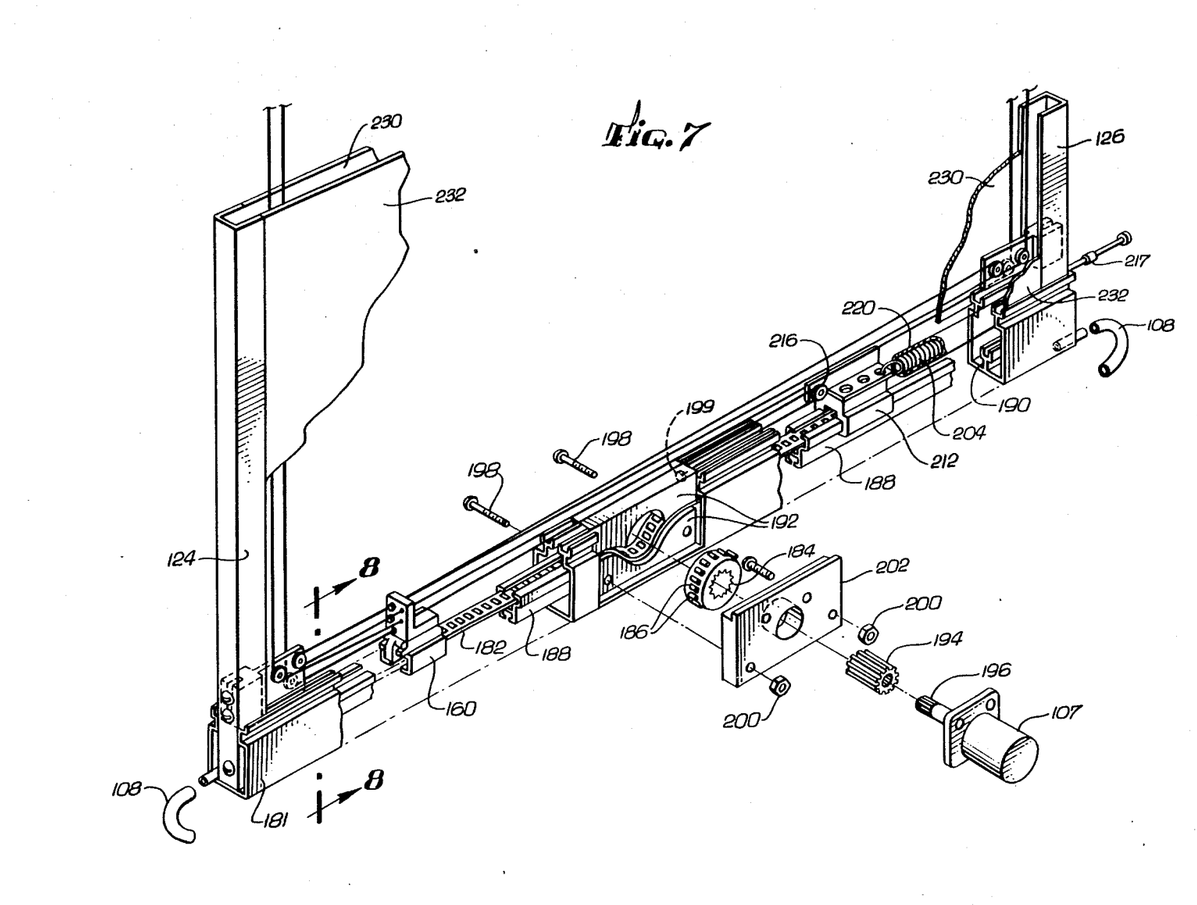
FIG. 7 is a partial exploded view of the inventive enclosure of the assembly shown in FIG. 2.

The means for moving the reciprocating block 160 to the left or right is shown in FIGS. 5 and 7. The reciprocating block 160 is attached to a slotted tape 182 which is engaged by a drive gear 184. The drive gear, which is coupled to the motor 107 rotates clockwise to lower the windowpane 106 by moving the tape and the reciprocating block 160 to the left and rotates counter-clockwise to move the reciprocating block 160 to the right to raise the window.

Figure 9:
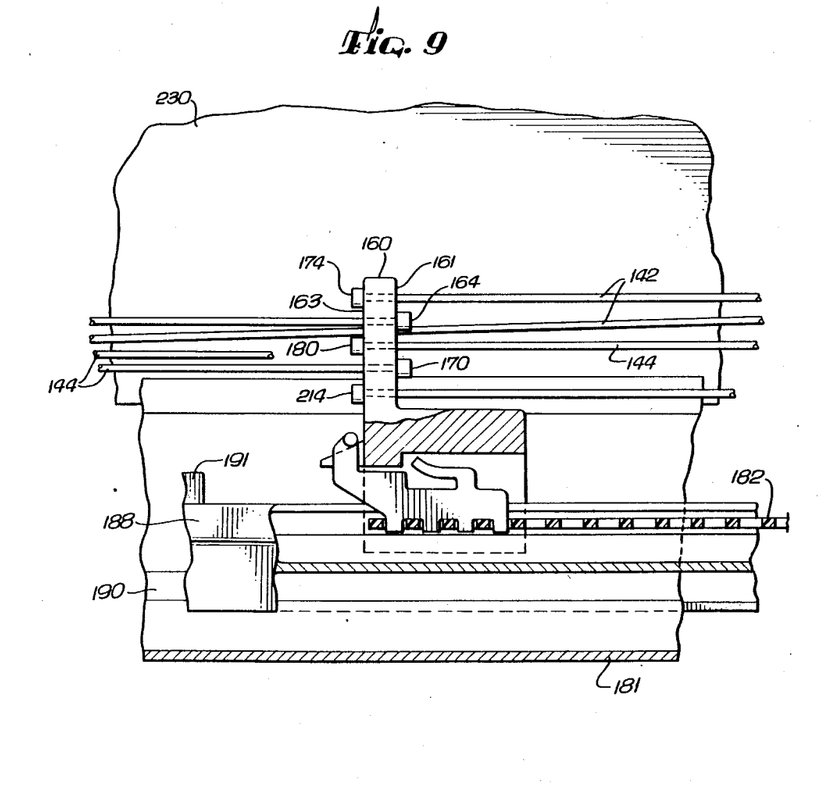
FIG. 9 is a partial sectional view taken along line 9—9 in FIG. 8.

Referring now to FIG. 7, the slotted tape, drive gear, reciprocating block and motor assembly are more clearly shown. These components are housed in the bottom channel 181 having a substantially U shaped cross section. The slotted tape 182 is a flexible plastic tape having a plurality of spaced apart substantially rectangular slots, which are designed to engage the teeth 186 on the drive gear 184. The reciprocating block 160 is secured to one end of the slotted tape 182 (FIG. 9). The slotted tape 182 is supported by a tape guide 188 which is held in its position by a tape guide support 190 that extends most of the length of the channel 181 (FIG. 7). Typically, the tape guide support 190 is integral with the bottom channel 181. A stop 191 (FIG. 5) is also mounted on the tape guide support to keep the reciprocating block 160 from moving too far to the left. Thus the window is prevented from being lowered too far.

The drive gear 184 is supported in the bottom channel 181 by a split block 192 (FIG. 7). The slotted tape 182 is dressed through the tape guide 188 between the two sections of the split block 192 and then back out into the remainder of the tape guide 188.

Furthermore, the drive gear 184, which has a hollow center, engages a coupling gear 194 inserted into the hollow center and that coupling gear in turn couples the nipple 196 of the motor 107. The entire assembly of the split blocks, drive gear, motor and associated coupling gear is held in place by bolts 198, nuts 200 and alignment block 202.

It is also important to note that means for counterbalancing the movement of the windowpane 106 are provided via counter-balance spring 204. Referring to FIG. 5, it can be seen that the reciprocating block 160 is coupled via the tension line 210 to the tension block 212 which is coupled to the counterbalance spring 204. The tension line 210 is attached to the reciprocating block 160 at the tension tie 214. The line 210 is dressed around the tension pulley 216 and is attached to the split block 192 at the tension screw 198.

When the power window assembly 100 is initially assembled at the factory, the tension of the counterbalance spring 204 is set by the counterbalance adjustor 217 (FIG. 5) to provide proper counterbalancing. By rotating the counter-balance adjustor 217 which is threaded through a hole (not shown) defined by the leg 126, the length of the spring 204 and thus the tension of the spring may be adjusted. Also to prevent vibration of the spring, the spring 204 is housed inside a spring cylinder 220 (FIG. 7).

Figure 6:
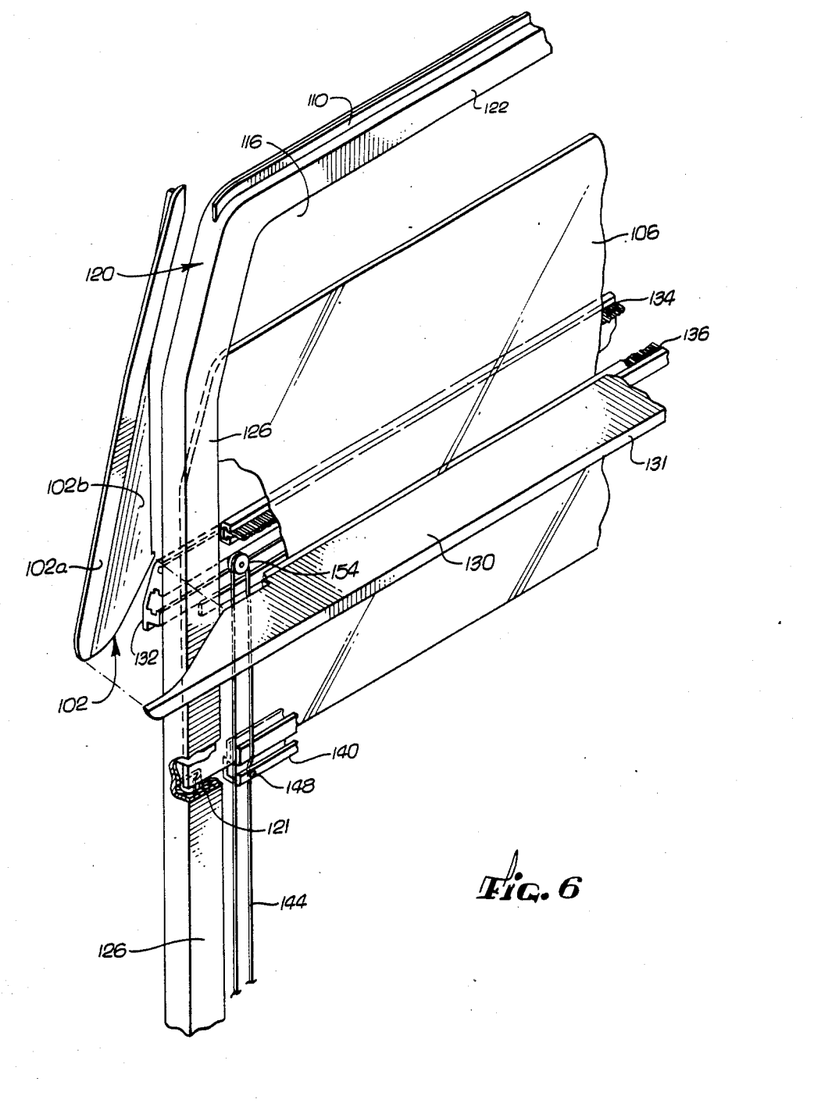
FIG. 6 is a partial exploded view of the inventive assembly shown in FIG. 2.

It should be noted that the drains 108 are inserted at both ends of the channel. These drains are necessary because moisture on the window can drip past the pile brushes 136 and 134 (FIG. 6). Drains 108 at both ends are needed to allow drainage of any moisture collecting in the bottom channel 182, irrespective of the tilt of the truck 10. After installing the window, holes need to be drilled in the bottom or the back of the cab body and the drains 108 need to be dressed to those holes. This will ensure that no water will collect inside the enclosure.

Figure 8:
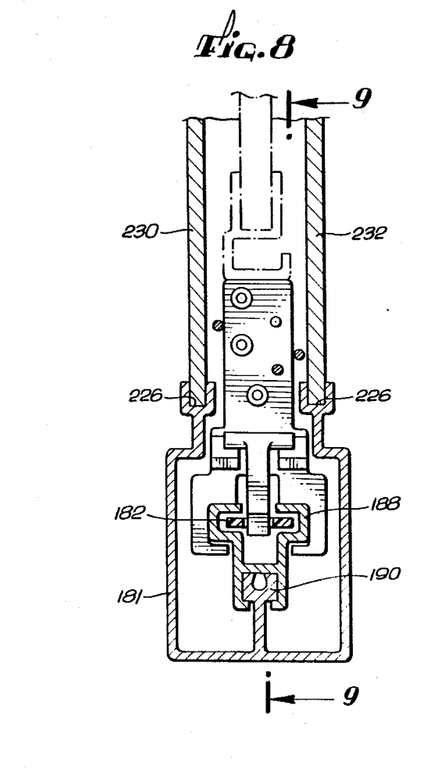
FIG. 8 is a sectional view taken along line 8—8 in FIG. 7.

Furthermore, for cosmetic purposes and for protecting the window raising and lowering means, the lower portion of the cabinet is covered by interior and exterior panels 230 and 232 (FIGS. 2 and 7) made of fiberboard or other suitable material. The bottom channel 181 has mounting slots 226 as shown in FIG. 8 into which the bottom ends of the front and rear panels 230 and 232 may be inserted. The top ends of the panels 230 and 232 mate with the braces 130 and 132 (FIG. 6). Thus, the entire raising and lowering means except for the motor 107 (FIG. 4) is housed inside the lower portion between the legs 124 and 126.

Also, wiring is installed to couple the reversing switch 50, which has three positions, to the motor 107, which is part of the enclosure, and the electrical system of the truck. By turning the switch between three positions, the window may be raised and lowered.

With the exception of the motor 107, the entire window raising and lowering means fits in the lower portion 104 of the power window assembly 100 between the two depending legs 124 and 126. This allows for a compact structure that occupies little space in the cab. Furthermore, because the distance between the legs is less than the length of the bottom frame edge of the window, the lower portion 20 easily slides into the window opening and is held in place by the bracket portion 131 and by the flange 110 on the bight portion being mounted in the rear channel 28 of the gasket 26. The corner pieces 102 also engage the rear channel 28 of the gasket, thereby providing a good seal with the side frame edges 16 and 18 when the window is installed.

Thus the power window assembly provides a unit that may be easily installed by the customer with no modifications to the cab of the truck or the automobile body except those modifications that may be easily made by the consumer. Furthermore, the pulley unit requires only a substantially constant low torque, during raising and lowering, by the motor. This pulley system also provides for quiet movement of the window. Although specific embodiments of the invention have been described, various modifications and variations within the scope of the invention will be apparent to those skilled in the art, including adapting this design for use as a window to be positioned between the front and rear seats in an automobile limousine or the like or also to be mounted in larger trucks.

What is claimed is:

1. A unitary, openable power window assembly mountable in the rear window opening of a truck cab or the like, said window opening having lower and upper frame edges, said assembly comprising:
    a unitary flat enclosure insertable through said window opening, the upper portion of said enclosure itself forming a window frame dimensioned to fit within said window opening, there being a windowpane housed within said enclosure and movable between a raised "window closed" position in which the pane is within said window frame and a lowered "window open" position in which the pane is situated within the lower portion of said enclosure;
    means for raising and lowering the pane;
    bracket means on the center rear of said enclosure for engaging the lower frame edge of said window opening to support said cab window assembly thereon; and
    flange means, at the top of said enclosure window frame, for engaging the upper frame edge of said window opening.

2. The power window assembly described in claim 1, wherein the enclosure has a substantially rectangular shape and comprises:
    an inverted U shaped frame having two depending legs; and
    a bottom channel, connecting the two legs together.

3. The power window assembly as described in claim 2 wherein the upper portion of the enclosure has a corner piece attached to each leg and the corner pieces are configured to engage the side frame edges of a rear cab window opening.

4. A power window assembly as described in claim 3 wherein the U shaped frame has a top, right portion including a flange for engaging a gasket mounted in a rear cab window opening.

5. A power window assembly as described in claim 3, wherein each corner piece has an edge adapted to be inserted into a channel of a gasket mounted in a rear cab window opening.

6. A power window assembly as described in claim 5, wherein at least part of the edge of each corner piece is angled in a rearward direction.

7. A power window assembly as described in claim 3, wherein the enclosure further includes a cross brace coupling the two legs and the bracket means is mounted on the cross brace.

8. A power window assembly as described in claim 7, wherein the bracket means is mounted in the channel of a gasket mounted in a rear cab window opening.

9. The power window assembly as described in claim 7, wherein the means for raising and lowering includes at least one pulley line having two ends and coupled to the windowpane such that pulling on the first end raises the pane and pulling on the second end lowers the pane.

10. The power window assembly as described in claim 9, wherein the means for raising and lowering includes means for selectively pulling on either of the two ends of the pulley line.

11. A power window assembly as described in claim 9, wherein the means for raising and lowering includes a second pulley line having two ends and is coupled to the window pane such that pulling on the first end of the second line raises the window pane and pulling on the second end of the second line lowers the window pane.

12. The power window assembly as described in claim 11, wherein the means for selectively pulling will simultaneously pull on the first ends of the two lines and will simultaneously pull on the second ends of the two lines.

13. A power window replacement assembly for the rear window of a truck cab or the like, comprising:
    a unitary flat enclosure having a bottom portion of a width sufficiently small to permit insertion into the truck cab through the truck cab rear window opening, said bottom portion comprising an enclosed housing;
    the enclosure comprising an upper portion comprising a frame for a windowpane, said frame being conformal with the opening of said rear window for passage therethrough;
    a window pane within said enclosure and slidable between a closed position in which said pane is within said frame in the upper portion and an open position in which said pane is within the bottom portion of said enclosure;
    means, within said lower housing portion, for raising and lowering the window glass; and
    mounting means on said enclosure for engaging the upper portion of said enclosure with the frame of said rear window opening, with the lower housing portion of said enclosure depending within said truck cab along the rear wall thereof.

14. A power window replacement assembly as described in claim 13, wherein the means for raising and lowering includes a reciprocating block mounted within the housing portion and moveable with respect to the sides of the truck cab, and
    coupling means attached to the block for selectively raising or lowering the window pane as the block moves with respect to the sides of the cab.

15. A power window replacement assembly as described in claim 14, wherein the means for raising and lowering further comprises:
    an electric motor;
    an elongated, moveable track attached to the block arranged beneath the window pane in the bottom portion; and
    at least one gear for coupling the motor to the elongated track.

16. A power window replacement assembly as described in claim 15, wherein the block has two opposed faces and the coupling means comprises:
    a pair of pulley lines attached to the window pane at opposed ends of the window pane, each pulley line having two ends and the two ends of each pulley line being attached to the block at opposed faces.

17. A power window enclosure adapted for being mounted in a vehicle window opening in a vehicle cab, the window opening being defined by an upper frame edge, a bottom frame edge and two side frame edges with the bottom frame edge being longer than the top frame edge, wherein the power window enclosure comprises:
    a substantially flat, rectangular shaped enclosure having a windowpane mounted therein and having upper and lower portions, with the upper portion defining an enclosure window opening and being dimensioned to fit through said vehicle window opening and with the lower portion having a size enabling it to be inserted through the vehicle window opening;

attachment means incorporated on the enclosure for mounting the enclosure in the truck cab, wherein the enclosure window opening is substantially aligned with the vehicle window opening; and power means housed in the lower portion for raising and lowering the window pane to open and close the cab window assembly.

18. A power window enclosure as described in claim 17, wherein the sides of the rectangularly shaped enclosure are defined by a U-shaped frame defined by a bight portion and two depending legs and the bight portion is configured to mate with the upper frame edge of the vehicle window opening.

19. A power window enclosure as described in claim 18, wherein the upper portion is dimensioned to fit in the vehicle opening by a side piece attached to each leg of the frame and the side pieces are adapted to mate with the side frame edges of the vehicle window opening.

20. A power window enclosure as described in claim 19, wherein the vehicle window opening has a rubber gasket along the upper frame edge and the bight portion has a flange adapted to engage the rubber gasket.

21. A power window enclosure as described in claim 20, wherein the enclosure includes a cross brace defining the boundary between the lower and upper portions, the cross brace forming a bracket adapted to engage with the lower frame edge of the window opening.

22. A power window enclosure as described in claim 17, wherein the cab window opening is lined with a gasket and wherein the rectangular enclosure comprises:
a top substantially straight bight portion adapted to engage the gasket;
a pair of elongated, straight legs attached to the bight portion at a substantially 90° angle such that the legs and bight portion form a U shaped channel with the window pane housed between the legs; and
a bottom channel coupling the ends of the legs together, forming a substantially rectangular frame with the bight portion and legs, the bottom channel defining the width of the rectangular enclosure.

23. A power window enclosure as described in claim 22, wherein the width of the enclosure is less than the length of the bottom frame edge.

24. A unitary, openable window assembly mountable in the rear window opening of a truck cab or the like, after removal of the fixed pane therefrom, said window opening having lower and upper frame edges, said assembly comprising:
a unitary flat enclosure insertable through said window opening, the upper portion of said enclosure itself forming a window frame dimensioned to fit within said window opening, there being a windowpane housed within said enclosure and movable between a raised "window closed" position in which the pane is within said window frame and a lowered "window open" position in which the pane is situated within the lower portion of said enclosure,
opening means, situated within the lower portion of said enclosure, for raising and lowering the pane,
bracket means on the center rear of said enclosure for engaging the lower frame edge of said window opening to support said cab window assembly thereon, and
flange means, at the top of said enclosure window frame, for engaging the upper frame edge of said window opening.

25. A power window replacement module assembly for replacing the glass in the rear cab window opening, wherein the rear cab window opening is lined with a gasket that has a channel formed along the inner edge of the gasket, said module assembly comprising:
a unitary flat enclosure insertable through said window opening, the perimeter of the upper portion of said enclosure being of a size and shape enabling it to be inserted in the channel of the gasket, said upper portion forming a window frame, there being a windowpane housed within said enclosure and movable between a raised "window closed" position in which the windowpane is within the window frame and a lowered "window open" position in which the pane is situated within the lower portion of said enclosure, and
power means, situated within the lower portion of said enclosure, for raising and lowering the pane.

26. A power window module as described in claim 25, wherein the enclosure includes a substantially U shaped frame having two depending legs and the legs form a slight angle with the perimeter of the upper portion.

27. A power window module as described in claim 26, wherein the upper portion includes a corner piece attached to each leg of the frame and each corner piece forms part of the perimeter of the upper portion.

28. A power window module as described in claim 27, wherein each corner piece is angled in a rearward direction from where it is coupled to the frame.

29. A power window module as described in claim 28, wherein the upper portion further includes an elongated rearward projecting cross brace coupling the two legs.

30. A power window module as described in claim 29, wherein the cross brace has a bracket portion that forms the bottom portion of said perimeter.

* * * * *